United States Patent
Tu

(10) Patent No.: US 12,282,560 B2
(45) Date of Patent: Apr. 22, 2025

(54) METHOD FOR BLOCKING EXTERNAL BOOT DEVICE, NON-TRANSIENT COMPUTER READABLE STORAGE MEDIUM, AND COMPUTER

(71) Applicant: MITAC COMPUTING TECHNOLOGY CORPORATION, Taoyuan (TW)

(72) Inventor: Ming-Chang Tu, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 286 days.

(21) Appl. No.: 18/191,492

(22) Filed: Mar. 28, 2023

(65) Prior Publication Data
US 2023/0325510 A1 Oct. 12, 2023

(30) Foreign Application Priority Data
Apr. 11, 2022 (TW) .................................. 111113734

(51) Int. Cl.
G06F 21/57 (2013.01)
G06F 9/4401 (2018.01)

(52) U.S. Cl.
CPC .......... *G06F 21/575* (2013.01); *G06F 9/4408* (2013.01); *G06F 2221/034* (2013.01)

(58) Field of Classification Search
CPC ....... G06F 21/57; G06F 21/575; G06F 9/4408
See application file for complete search history.

(56) References Cited

U.S. PATENT DOCUMENTS

| 6,684,326 B1 * | 1/2004 | Cromer | H04L 63/123 713/1 |
| 7,917,762 B2 * | 3/2011 | Lewis | G06F 21/575 713/180 |
| 2005/0144432 A1 * | 6/2005 | Wu | G06F 8/65 713/2 |
| 2008/0120499 A1 * | 5/2008 | Zimmer | G06F 21/52 726/17 |

(Continued)

FOREIGN PATENT DOCUMENTS

| TW | 201137750 A | 11/2011 |
| TW | I758038 B | 3/2022 |

*Primary Examiner* — Shanto Abedin
(74) *Attorney, Agent, or Firm* — RABIN & BERDO, P.C.

(57) ABSTRACT

A method for blocking an external boot device, a non-transient computer readable storage medium, and a computer are provided. The method includes: executing BIOS program code in a POST process, where the program code includes a BIOS setup menu, which includes a boot device option; hiding device information of an external boot device in the boot device option when determining that the external boot device is classified as a restricted device; displaying a boot device menu when determining that received input information is consistent with a piece of hot key information, where the boot device menu includes the device information of the external boot device; displaying a password input window when determining that the external boot device corresponding to received selection information is classified as the restricted device; and reading the external boot device to execute operating system program code when determining that received password information matches a preset password.

20 Claims, 8 Drawing Sheets

(56) References Cited

U.S. PATENT DOCUMENTS

| | | | |
|---|---|---|---|
| 2012/0011354 A1* | 1/2012 | Owen | G06F 9/4408 |
| | | | 713/2 |
| 2012/0066499 A1* | 3/2012 | Ali | G06F 21/305 |
| | | | 713/170 |
| 2012/0284494 A1* | 11/2012 | Funk | G06F 9/4401 |
| | | | 713/2 |
| 2014/0325665 A1* | 10/2014 | Duca | G06F 21/575 |
| | | | 726/26 |
| 2016/0232356 A1* | 8/2016 | Barkelew | G06F 9/4401 |

\* cited by examiner

METHOD FOR BLOCKING EXTERNAL BOOT DEVICE, NON-TRANSIENT COMPUTER READABLE STORAGE MEDIUM, AND COMPUTER

CROSS-REFERENCE TO RELATED APPLICATION

This non-provisional application claims priority under 35 U.S.C. § 119(a) to Patent Application No. 111113734 filed in Taiwan, R.O.C. on Apr. 11, 2022, the entire contents of which are hereby incorporated by reference.

BACKGROUND

Technical Field

The present disclosure relates to a method for blocking an external boot device, a non-transient computer readable storage medium, and a computer.

Related Art

The Basic Input/Output System (BIOS) of a conventional host device provides users with the ability to select one of multiple boot devices for data reading, or presets a data reading order for the plurality of boot devices. However, the security of the boot device is questioned. For example, the boot device may be intentionally or accidentally implanted with a virus program or a user steals data through the boot device.

Especially, due to the characteristics of being light and portable, small in size, and easy to hide, an external boot device causes security risks for the administrator in maintaining the security of the host device system. For example, in a scenario in which the administrator allows a third-party user (for example, maintenance personnel or customer) to operate the BIOS to execute the host settings and the boot program, there is a management risk that the user may secretly use an external boot device that is carried by the user and that is not approved by the administrator to execute the boot program.

SUMMARY

In view of this, the inventor provides a method for blocking an external boot device, applicable to a BIOS of a computer. The method for blocking an external boot device is used for hiding device information of an external boot device connected to the computer. The external boot device is configured to store operating system (OS) program code.

The method for blocking an external boot device includes: executing, by a processing circuit, BIOS program code in a power-on self-test (POST) process of the computer, where the BIOS program code is used for causing the processing circuit to display a BIOS Setup Menu, and the BIOS setup menu includes a boot device option (Boot Option); determining, by the processing circuit, whether the external boot device is classified as a restricted device or an unrestricted device, and hiding, by the processing circuit, device information of the external boot device in the boot device option when the processing circuit determines that the external boot device is classified as the restricted device; receiving, by the processing circuit, input information, and displaying, by the processing circuit, a boot device menu (Boot Menu) when the processing circuit determines that the input information is consistent with a piece of hot key information, where the boot device menu includes the device information of the external boot device; receiving, by the processing circuit, selection information from the boot device menu, and displaying, by the processing circuit, a password input window when the processing circuit determines that the external boot device corresponding to the selection information is classified as the restricted device; and receiving, by the processing circuit, a piece of password information from the password input window, and reading, by the processing circuit when the processing circuit determines that the piece of password information is consistent with a preset password, the external boot device to execute the OS program code.

DETAILED DESCRIPTION

Figure 1:
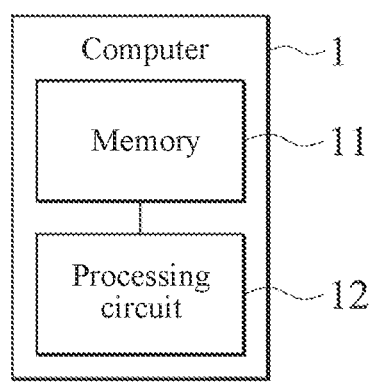
FIG. 1 is a schematic block diagram of a computer to which a method for blocking an external boot device is applicable according to some embodiments.

FIG. 1 is a schematic block diagram of a computer to which a method for blocking an external boot device is applicable according to some embodiments. Referring to FIG. 1, a computer 1 includes a memory 11 and a processing circuit 12 coupled to the memory 11. The computer 1 may refer to a computing device that allows boot settings, for example, a personal computer, a server, or a tablet computer. The memory 11 may be a non-volatile memory, for example, a flash memory or an electrically erasable programmable read-only memory (EEPROM), configured to store BIOS program code, program code of the method for blocking an external boot device, an administrator permission password, and a preset password of a restricted device. The processing circuit 12 may be a central processing unit (CPU) or a system on a chip (SoC), configured to execute the BIOS and the method for blocking an external boot device.

The method for blocking an external boot device is applicable to the BIOS of the computer 1. The BIOS refers to an interface that allows boot settings, for example, a conventional BIOS interface or a unified extensible firmware interface (UEFI). After the computer 1 is turned on, the processing circuit 12 can read the memory 11 to obtain and execute the BIOS program code and the program code of the method for blocking an external boot device. In addition, the processing circuit 12 can control a displayer to display or hide information on the BIOS interface. To help understood the method for blocking an external boot device of the present disclosure, descriptions are provided below according to some embodiments of the method for blocking an external boot device.

Figure 2A:
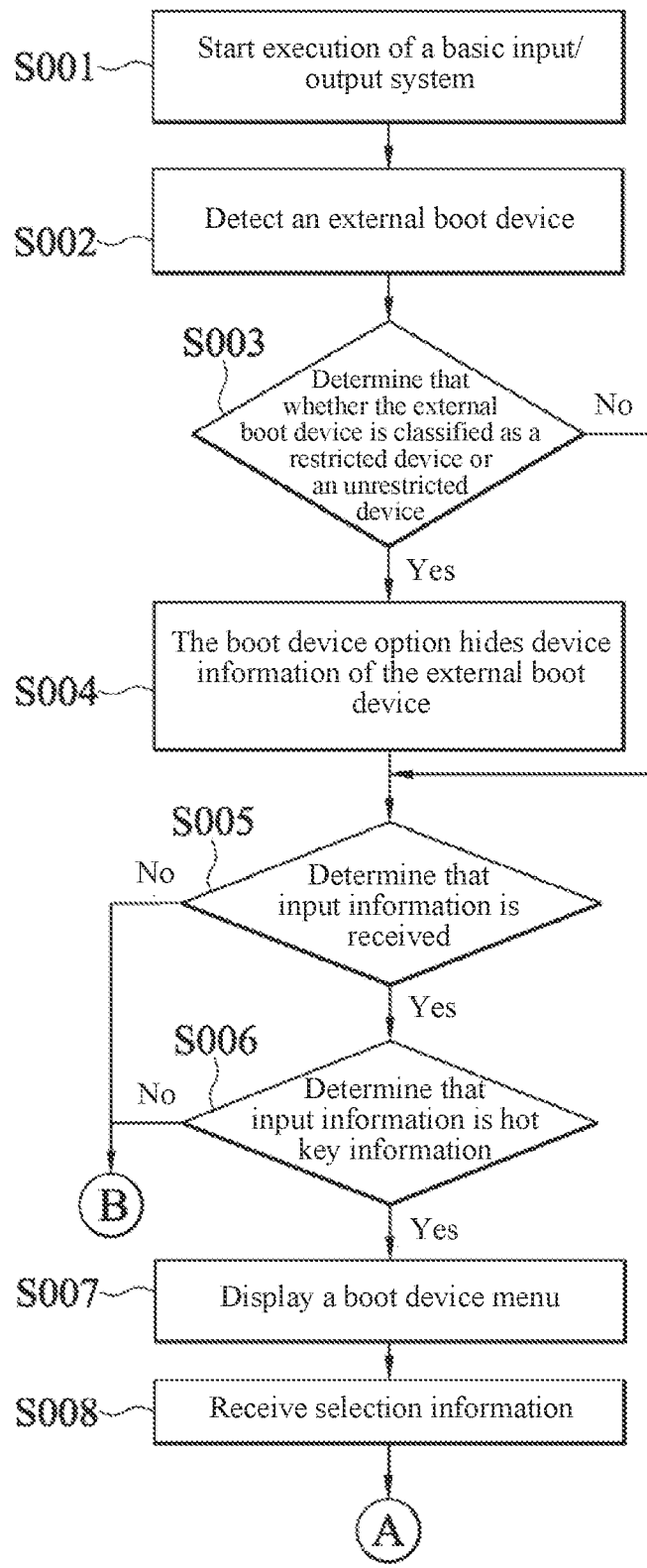
FIG. 2A is a first partial flowchart of a BIOS to which a method for blocking an external boot device is applicable according to some embodiments.
Figure 2B:
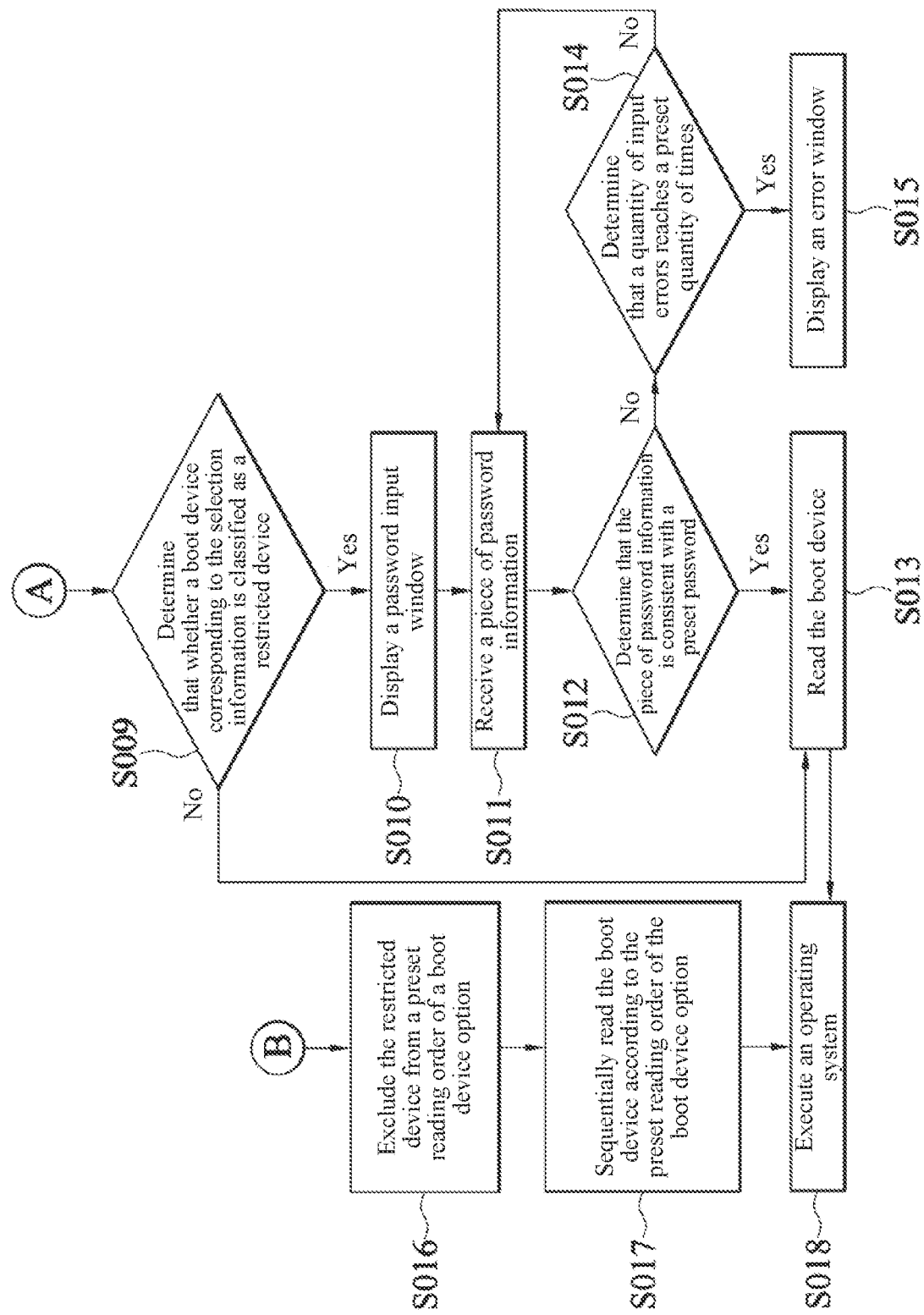
FIG. 2B is a second partial flowchart of a BIOS to which a method for blocking an external boot device is applicable according to some embodiments.

FIG. 2A is a first partial flowchart of a BIOS to which a method for blocking an external boot device is applicable according to some embodiments. FIG. 2B is a second partial flowchart of a BIOS to which a method for blocking an external boot device is applicable according to some embodiments. First, referring to FIG. 2A, after execution of a BIOS is started (step S001), when the external boot device is connected to and detected by the computer 1 executing the BIOS (step S002), the computer 1 continues to perform the method for blocking an external boot device. In the method for blocking an external boot device, the computer 1 determines that whether the external boot device is classified as a restricted device (step S003). According to some embodiments, step S002 and step S003 are performed in the DXE phase of the POST process, and the computer 1 determines that whether the external boot device is connected by identifying a hardware status or a protocol structure (Architecture Protocols).

Figure 3A:
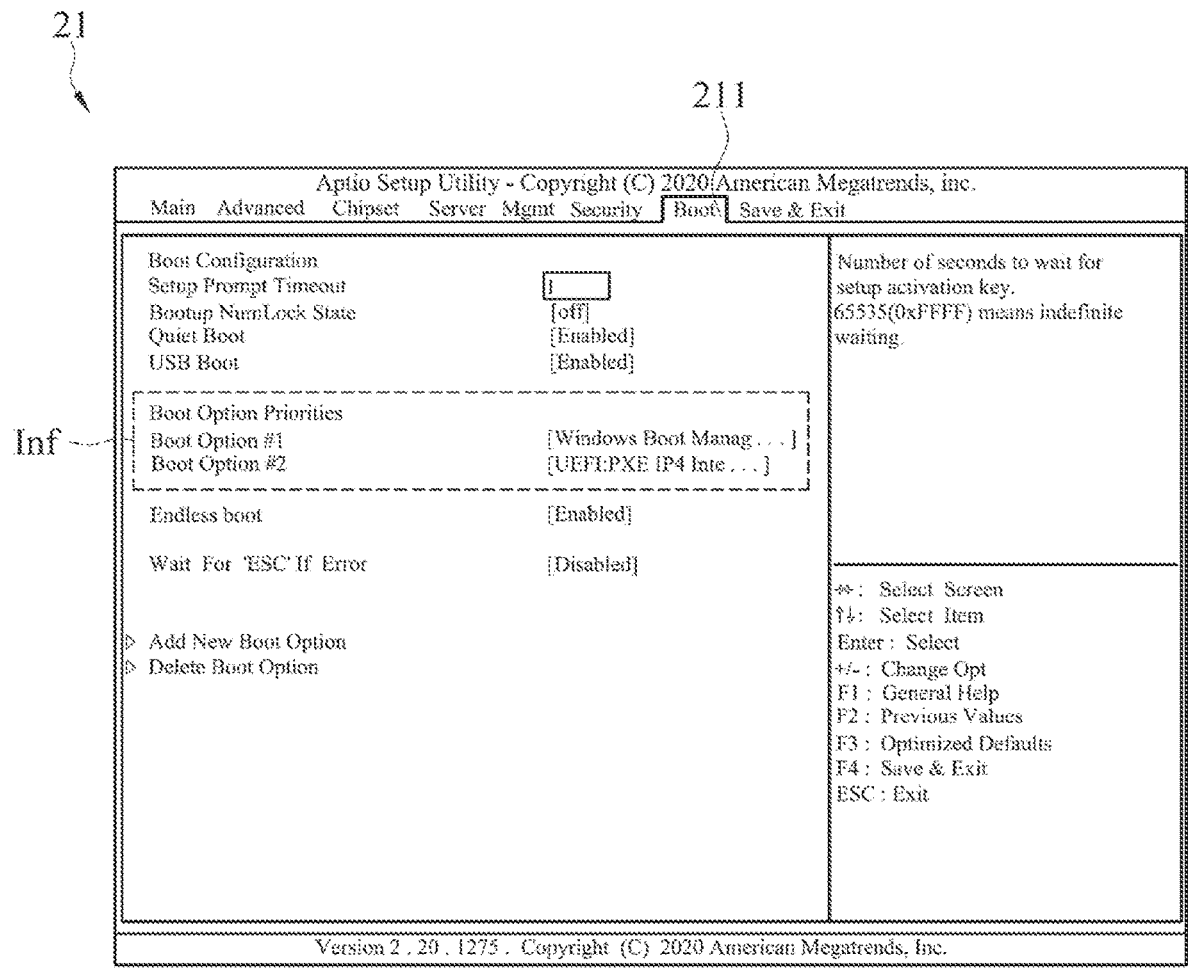
FIG. 3A is a schematic diagram of a boot device option of a BIOS setup menu according to some embodiments.

In the method for blocking an external boot device, when the computer 1 determines that the external boot device is classified as the restricted device (in step S003, a determination result is "Yes"), the computer 1 hides a piece of device information Inf of the external boot device in a boot device option 211 (Boot Option) (step S004). The boot device option 211 is set in a BIOS setup menu 21 of a BIOS interface. FIG. 3A is a schematic diagram of a boot device option of a BIOS setup menu according to some embodiments. Referring to FIG. 3A, according to some embodiments, the BIOS setup menu 21 of the BIOS interface includes options such as "Main", "Advanced", "Chipset", "Server", "Mgmt", "Security", "Boot" (the boot device option 211), and "Save & Exit" (a storage and end option 212). Options in FIG. 3A are presented in pagination, but are not limited thereto, and may also be presented in a form such as a list, a dropdown-menu, a popup menu, or a child window. The external boot device may refer to a device connected to a specific port of the computer 1 through a communication interface, and may be of a device type, for example, a flash drive, an external hard disk, an external CD-ROM, or a local area network connection device. The communication interface may adopt a protocol such as the Universal Serial Bus (USB), the local area network (LAN), the sequence advanced technology attachment (SATA), or the non-volatile memory express (NVMe). According to some embodiments, the standard for classifying the restricted device is defined according to a communication interface type. For example, in case that a USB device connected to the computer 1 is classified as a restricted device. Therefore, when a USB flash drive and a SATA hard drive are connected to the computer 1, information about the USB flash drive displayed in the BIOS interface is hidden through the method for blocking an external boot device, and information about the hard drive is displayed by the BIOS interface. Therefore, the USB flash drive can't be accessed without permission. In this way, it is allowed to manage external devices, which adopts a specific communication interface (for example, an USB device usually has a small volume and is easy to carry, which may lead to some security problem). According to some embodiments, the standard for classifying the restricted device is defined according to a device type. According to another embodiment, the standard for classifying the restricted device is defined according to a device name, so as to allow the computer 1 to hide the piece of device information Inf for a specific device.

In the embodiment of FIG. 3A, the boot device option 211 includes a setting item "Boot Option Priorities" (boot device priority), displays boot devices detected by BIOS, for example, boot devices such as [Windows Boot Manag . . . ] and [UEFI: PXE IP4 Inte . . . ], and does not display boot devices that are determined as restricted devices. Therefore, a user can make a selection from boot devices displayed in the boot device option 211 or adjust a priority order, so that the BIOS tests and reads the boot device one by one. However, the restricted devices neither can be selected directly by the user, nor can be read sequentially by the BIOS (the accessibility of the restricted device is limited).

Figure 3B:
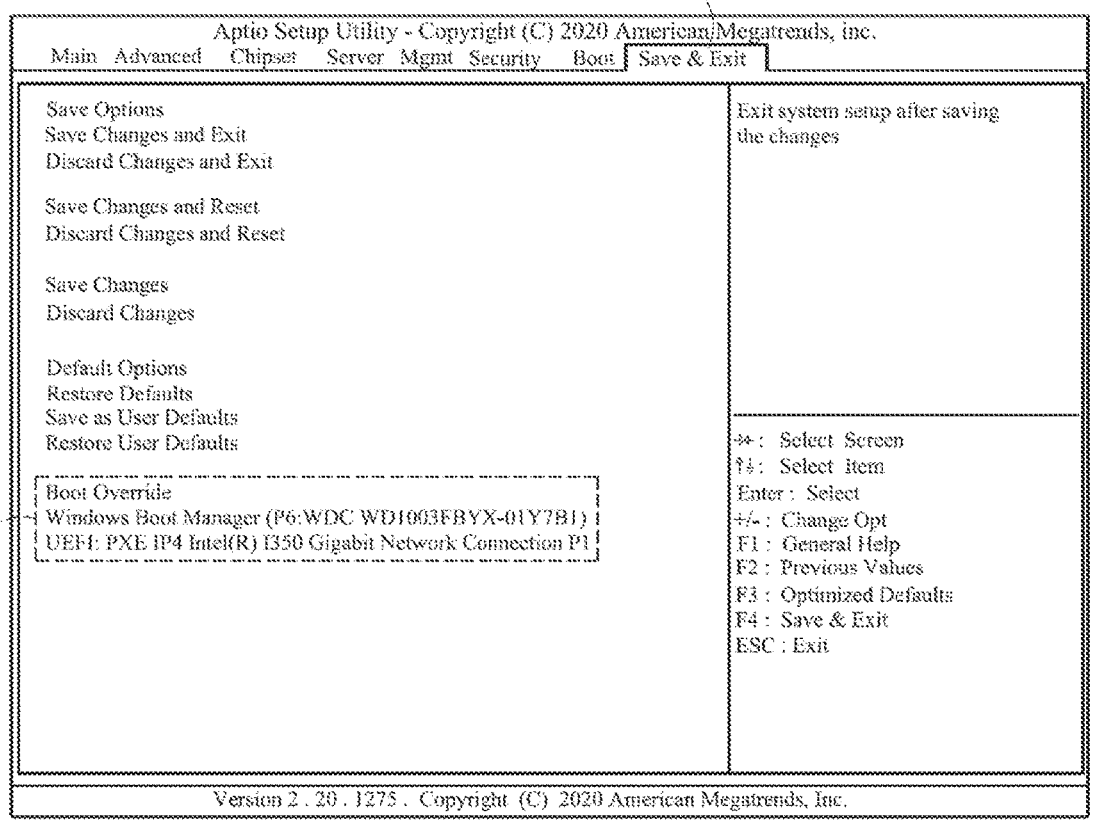
FIG. 3B is a schematic diagram of a storage and end option of a BIOS setup menu according to some embodiments.

According to some embodiments, when the computer 1 determines that the external boot device is classified as the restricted device, in the method for blocking an external boot device, the piece of device information Inf of the external boot device is hidden in the storage and end option 212. FIG. 3B is a schematic diagram of a storage and end option of a BIOS setup menu according to some embodiments. Referring FIG. 3B, in this embodiment, the storage and end option 212 includes a setting item Set of "Boot Override" (changing a boot device), displays boot devices detected by the BIOS, for example, boot devices such as [Windows Boot Manager (P6: WDC WD1003FBYX-01Y7B1)] and [UEFI: PXE IP4 Intel® 1350 Gigabit Network Connection P1], and does not display boot devices that are classified as restricted devices.

Referring to FIG. 2A again, when the computer 1 determines that the external boot device is not classified as the restricted device (in step S003, a determination result is "No"), in the method for blocking an external boot device, step S004 is skipped, and execution of the remaining POST process is continued. According to some embodiments, step S004 or steps S003 and S004 are executed in the BDS phase of the POST process, and the device information Inf of external boot devices connected to the computer 1 are displayed (wherein the restricted devices are hidden) and provided for the user to select or sort.

The computer 1 allows receiving input information through a peripheral device such as a keyboard or a mouse. When the computer 1 determines that input information is received (in step S005, a determination result is "Yes"), the computer 1 further determines that whether the input information is consistent with a piece of hot key information (step S006). For example, it is determined whether the input information corresponds to a preset keyboard key "F6". When the computer 1 determines that the input information is consistent with the piece of hot key information (in step S006, a determination result is "Yes"), a boot device menu 22 (boot device menu) is displayed (step S007). When the computer 1 determines that no input information is received (in step S005, a determination result is "No"), or when the computer 1 determines that the input information is inconsistent with the piece of hot key information (in step S006, a determination result is "No"), execution of the remaining POST process is continued.

Figure 4:
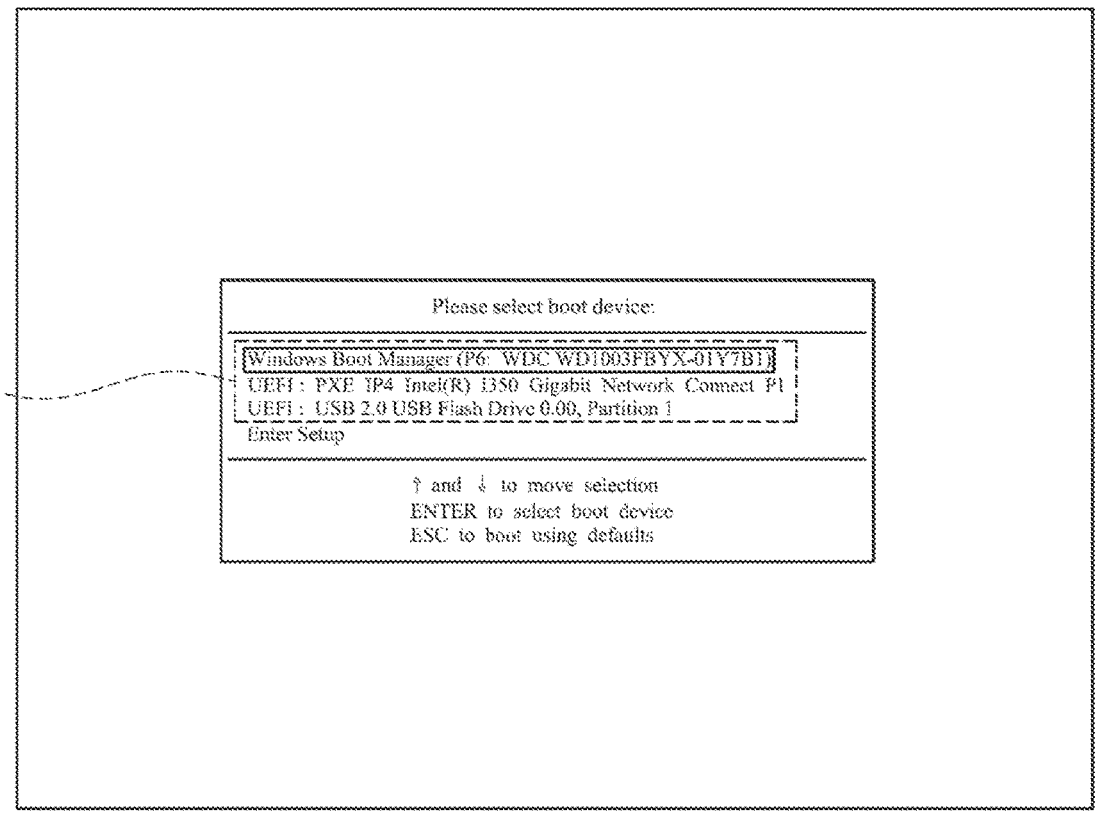
FIG. 4 is a schematic diagram of a boot device menu according to some embodiments.

FIG. 4 is a schematic diagram of a boot device menu according to some embodiments. Referring to FIG. 4, according to some embodiments, a boot device menu 22 displays all boot devices detected by the BIOS, including restricted devices. For example, the boot device menu 22 of FIG. 4 totally displays boot devices such as [Windows Boot Manager (P6: WDC WD1003FBYX-01Y7B1)], [UEFI: PXE IP4 Intel® 1350 Gigabit Network Connection P1], and

[UEFI: USB 2.0 USB Flash Drive 0.00, Partition 1]. A boot device of which the piece of device information Inf is [UEFI: USB 2.0 USB Flash Drive 0.00, Partition 1] is determined as a restricted device through the method for blocking an external boot device, and is not shown in the boot device option 211 of the BIOS setup menu 21 of FIG. 3A or the storage and end option 212 of the BIOS setup menu 21 of FIG. 3B. According to some embodiments, in the method for blocking an external boot device, the boot device menu 22 is displayed only after it is determined that a hot key is pressed, and the boot device menu 22 does not provide setting for a boot device priority. According to some embodiments, in the method for blocking an external boot device, the restricted device is excluded from a preset reading order of the boot device option 211 (step S016). In this way, in a case that the user does not select a boot device, the BIOS reads a boot device (an unrestricted device) in the first order of the boot device option 211 of the BIOS setup menu 21 (step S017), and cannot read the restricted device defined by the user.

Figure 5:
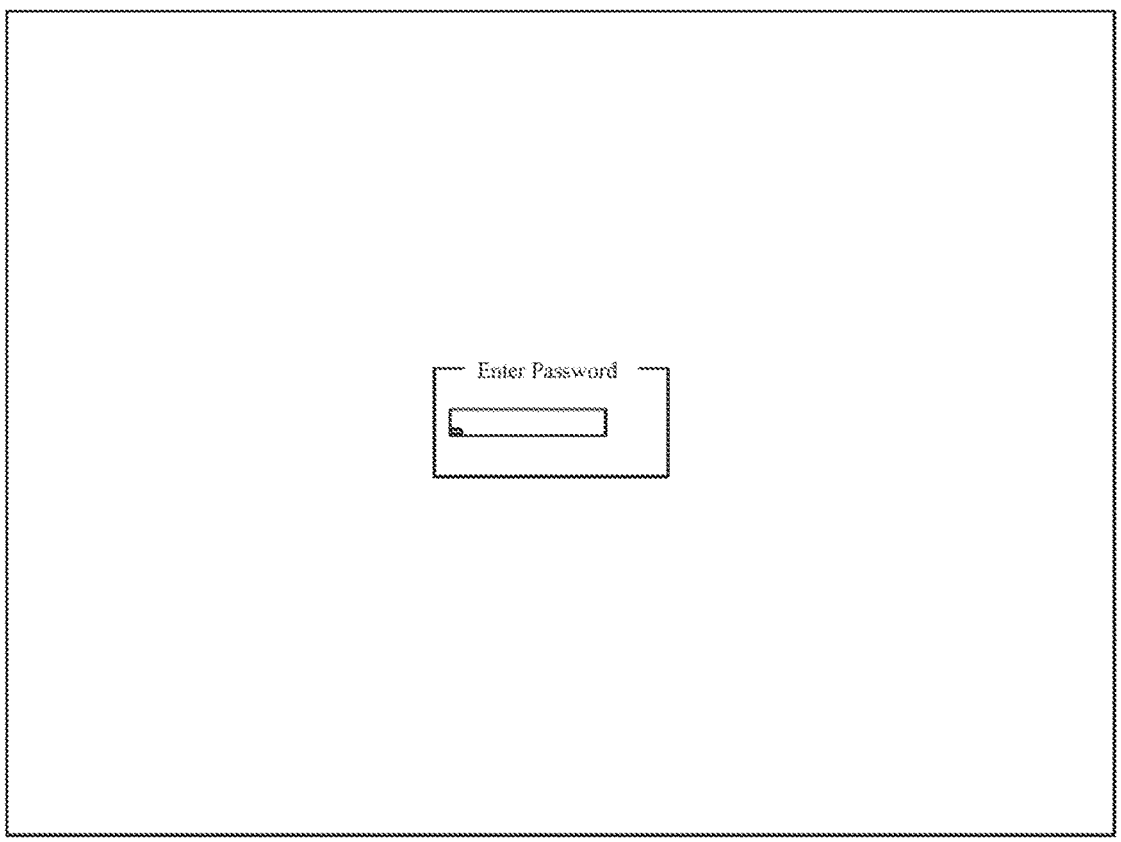
FIG. 5 is a schematic diagram of a password input window according to some embodiments.

Referring to FIG. 2A and FIG. 2B, after the user selects any boot device displayed in the boot device menu 22, in the method for blocking an external boot device, selection information is received (step S008), and the computer 1 further determines that whether a boot device corresponding to the selection information is classified as a restricted device (FIG. 2B, step S009). FIG. 5 is a schematic diagram of a password input window according to some embodiments. Referring to FIG. 2B with FIG. 5 as a supplement, according to some embodiments, when the computer 1 determines that the boot device corresponding to the selection information is not classified as the restricted device (in step S009, a determination result is "No"), the computer 1 reads the boot device corresponding to the selection information (step S013) and executes an operating system saved by the boot device (step S018). When the computer 1 determines that the boot device corresponding to the selection information is classified as the restricted device (in step S009, a determination result is "Yes"), the computer 1 displays a password input window 23 (step S010) and receives a piece of password information entered by the user in the password input window 23 (step S011). When the computer 1 determines that the piece of password information is consistent with a preset password (in step S012, a determination result is "Yes"), the computer 1 reads a restricted device corresponding to the selection information (step S013) and executes an operating system saved by the restricted device (step S018). When the computer 1 determines that the piece of password information is inconsistent with the preset password (in step S012, a determination result is "No"), a quantity of input errors is accumulated.

The computer 1 determines that whether the quantity of input errors reaches a preset quantity of times (step S014). When the computer 1 determines that whether the quantity of input errors does not reach a preset quantity of times (in step S014, a determination result is "No"), a process of step S011 and step S012 is re-performed. When the computer 1 determines that whether the quantity of input errors reaches a preset quantity of times (in step S014, a determination result is "Yes"), an error window is displayed (step S015). According to some embodiments, when the computer 1 determines that the quantity of input errors reaches a preset quantity of times, in the method for blocking an external boot device, the piece of device information Inf of the restricted device corresponding to the selection information is stored, and accessibility of the restricted device is blocked. Therefore, the user is only allowed to unblock the restricted device after entering an administrator permission password in the error window or BIOS setup menu 21. According to some embodiments, the BIOS skips executing the process of step S016 to step S018 in a state of the error window. Therefore, the computer 1 stays in a POST process phase, does not read the restricted device or the boot device in the first order of the boot device option 211 of the BIOS setup menu 21, and does not enter an operating system phase. According to some embodiments, when the BIOS enters the state of the error window, the computer 1 re-performs the process of FIG. 2A and FIG. 2B after being shut down and rebooted. According to some embodiments, when the BIOS displays the error window, the user is only allowed to close the error window and re-perform the process of FIG. 2A and FIG. 2B after entering the administrator permission password in the error window or BIOS setup menu 21.

According to some embodiments, when the computer 1 determines that the external boot device is not classified as the restricted device (in step S003, a determination result is "No"), after the computer 1 determines that the input information is consistent with the piece of hot key information (step S006), processes, such as step S009 to step S012, step S014, and step S015, are skipped. Therefore, after the BIOS displays the boot device menu 22 (step S007) and receives the selection information (step S008), the boot device is directly read (step S013), to save the computation time of executing the procedure of step S009, step S012, or the like.

Figure 6:
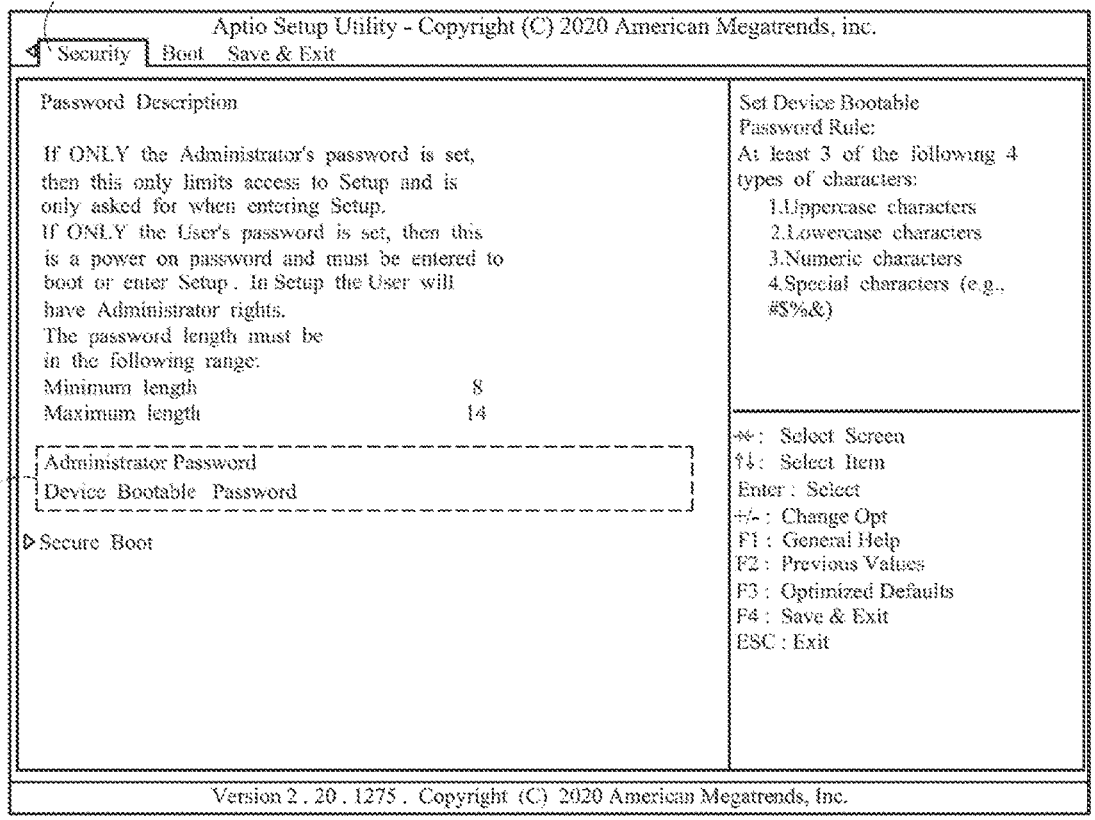
FIG. 6 is a schematic diagram of a security setting option of a BIOS setup menu according to some embodiments.

FIG. 6 is a schematic diagram of a security setting option of a BIOS setup menu according to some embodiments. Referring to FIG. 6, according to some embodiments, the BIOS setup menu 21 includes a security setting option 213. The security setting option 213 can provide setting items Set such as an administrator permission password, a communication protocol of a restricted device, a type of a restricted device, a name of a restricted device, a preset password of the restricted device, and a preset quantity of times for password error determining. According to some embodiments, the administrator permission password corresponds to the highest operation permission of the computer 1, and the administrator of the computer 1 can freely select each configurable BIOS setting parameter in the BIOS setup menu 21 by using the administrator permission password, and modify the setting of the selected parameter, for example, adjust the communication protocol of the classifying standard of the restricted device, the hardware type of the classifying standard of the restricted device, the name of the classifying standard of the restricted device, the preset password of the restricted device, or the preset quantity of times for password error determination. According to some embodiments, the preset password of the restricted device corresponds to the hardware type of the classifying standard of the restricted device, or the communication protocol type of the classifying standard of the restricted device. For example, a USB device adopts a Type-C protocol corresponds to a preset password A, a device adpots the micro USB protocol corresponds to a preset password B, and a device adopts the SATA protocol corresponds to a preset password C. Therefore, the administrator of the computer 1 can grant a user a preset password corresponding to an external boot device of the user after a type or a communication protocol of the external boot device held by the user of the computer 1 is approved. Therefore, the user cannot execute the boot program using a device of another type or communication protocol. According to some embodiments, the preset password of the restricted device corresponds to a name or a device number of the restricted device. Therefore, for the external boot device held by the user of the computer 1, the administrator of the computer 1 can set, after checking data or executing a virus scanning program, a preset password of the external boot device in the BIOS setup menu 21 of the BIOS interface by using the administrator permission. Therefore, the user cannot use a restricted device other than the external boot device to execute the boot program.

In conclusion, the method for blocking an external boot device is provided for the administrator of the computer to hide the piece of device information of a specific boot device, to avoid a user of the computer, such as the maintenance personnel or customer, from executing a boot program of the computer by using an external boot device that is carried by the user and that is not approved by the administrator, and causing the problem that the computer infected by a virus or a secret information stolen by hacker. According to some embodiments, the restricted device is hidden from the boot device option 211 of the BIOS setup menu 21, so that in a process in which the BIOS completes the POST process and sequentially reads the boot device in the boot device option 211, no restricted device is automatically read by the system. According to some embodiments, an error window is displayed, and the operating system is not entered after the user has entered an incorrect password for a preset quantity of times, so that the error window state of the BIOS can only be released through the administrator permission. According to some embodiments, an external boot device with a higher security risk is classified as a restricted device in advance. Therefore, in some embodiments, the method for blocking an external boot device, on the one hand, is beneficial for the administrator to maintain the security of the system, and on the other hand, takes convenience into account since in a case that the user obtains the preset password of the device; the user can use the external boot device by only pressing the hot key and entering the password without perform rebooting for opening the permission of the external boot device.

What is claimed is:

1. A method for blocking an external boot device, applicable to a basic input/output system (BIOS/UEFI) of a computer, wherein the method for blocking an external boot device is used for hiding device information of an external boot device connected to the computer, the external boot device is configured to store operating system (OS) program code, and the method for blocking an external boot device comprises:
    executing, by a processing circuit, BIOS program code in a power-on self-test (POST) process of the computer, wherein the BIOS program code is executed by the processing circuit to display a BIOS setup menu, and the BIOS setup menu comprises a boot device option (Boot Option);
    detecting, by the processing circuit, whether the external boot device exists;
    further determining, by the processing circuit when determining that the external boot device exists, whether the external boot device is classified as a restricted device or an unrestricted device, and hiding, by the processing circuit, device information of the external boot device in the boot device option when the processing circuit determines that the external boot device is classified as the restricted device; and
    receiving, by the processing circuit, input information, and displaying, by the processing circuit, a boot device menu when the processing circuit determines that the input information is consistent with a piece of hot key information, wherein the boot device menu comprises the device information of the external boot device.

2. The method for blocking an external boot device according to claim 1, wherein after the step of determining, by the processing circuit, whether the external boot device is classified as the restricted device or the unrestricted device, the method further comprises: displaying, by the processing circuit when the processing circuit determines that the external boot device is classified as the unrestricted device, the device information of the external boot device.

3. The method for blocking an external boot device according to claim 1, wherein the boot device option comprises a preset reading order, and the method for blocking an external boot device further comprises: excluding, by the processing circuit, the external boot device from the preset reading order when the processing circuit determines that the external boot device is classified as the restricted device.

4. The method for blocking an external boot device according to claim 3, wherein after the step of excluding, by the processing circuit, the external boot device from the preset reading order, the method further comprises: sequentially reading, by the processing circuit, a boot device according to the preset reading order of the boot device option.

5. The method for blocking an external boot device according to claim 4, wherein the boot device menu comprises a displayed list in which the boot device is arranged according to the preset reading order, and the displayed list in the boot device menu provides a setting for a priority of the boot device.

6. The method for blocking an external boot device according to claim 4, wherein the step of detecting, by the processing circuit, whether the external boot device exists further comprises: sequentially reading the boot device according to the preset reading order of the boot device option when the processing circuit determines that the external boot device is not detected within a predetermined time period.

7. The method for blocking an external boot device according to claim 1, wherein after the step of receiving, by the processing circuit, input information, the method further comprises: continuing executing the POST process when the processing circuit determines that the input information is inconsistent with the piece of hot key information.

8. The method for blocking an external boot device according to claim 1, wherein the step of receiving, by the processing circuit, input information further comprises: continuing executing the POST process when the processing circuit determines that the input information is not received within a predetermined time period.

9. The method for blocking an external boot device according to claim 1, wherein after the step of displaying, by the processing circuit, a boot device menu, the method further comprises:
    receiving, by the processing circuit, selection information from the boot device menu, and displaying, by the processing circuit, a password input window when the processing circuit determines that the external boot device corresponding to the selection information is classified as the restricted device; and
    receiving, by the processing circuit, a piece of password information from the password input window, and reading, by the processing circuit when the processing circuit determines that the piece of password information is consistent with a preset password, the external boot device to execute the OS program code.

10. The method for blocking an external boot device according to claim 9, wherein after the step of receiving, by the processing circuit, selection information from the boot device menu, the method further comprises: reading the external boot device to execute the OS program code, by the processing circuit, when the processing circuit determines that the external boot device corresponding to the selection information is classified as the unrestricted device.

11. The method for blocking an external boot device according to claim 9, wherein after the step of receiving, by the processing circuit, the piece of password information from the password input window, the method further comprises: displaying an error message and does not execute the OS program code, by the processing circuit, when the processing circuit determines that the piece of password information is inconsistent with the preset password for a preset quantity of times.

12. The method for blocking an external boot device according to claim 11, wherein the error message is displayed in an error window, the processing circuit receives a piece of administrator permission password information from the error window, and re-performs, when the processing circuit determines that the piece of administrator permission password information is consistent with a preset administrator permission password, the method for blocking an external boot device starting from the step of detecting, by the processing circuit, whether the external boot device exists.

13. The method for blocking an external boot device according to claim 9, wherein the processing circuit determines, according to a communication interface type of the external boot device, whether the external boot device is classified as the restricted device or the unrestricted device.

14. The method for blocking an external boot device according to claim 13, wherein the external boot devices of the same communication interface type correspond to the same preset password.

15. The method for blocking an external boot device according to claim 14, wherein the BIOS setup menu comprises a password setting window, the processing circuit receives a piece of administrator permission password information from the password setting window, and after the processing circuit determines that the piece of administrator permission password information is consistent with a preset administrator permission password, the password setting window provides a setting for the preset password of the external boot device.

16. The method for blocking an external boot device according to claim 1, wherein a communication interface of the external boot device connected to the computer is selected from a group comprising a Universal Serial Bus (USB), a local area network (LAN), a sequence advanced technology attachment (SATA), and a non-volatile memory express (NVMe).

17. The method for blocking an external boot device according to claim 1, wherein the processing circuit determines, according to a device name or a device type of the external boot device, whether the external boot device is classified as the restricted device or the unrestricted device.

18. The method for blocking an external boot device according to claim 1, wherein the method for blocking an external boot device is performed in a driver environment execution (DXE) phase and a boot device selection (BDS) phase of the POST process.

19. The method for blocking an external boot device according to claim 1, wherein after the step of determining, by the processing circuit, whether the external boot device is classified as the restricted device or the unrestricted device, the method further comprises: reading, by the processing circuit when the processing circuit determines that the external boot device is classified as the unrestricted device, the external boot device, to execute the operating system program code.

20. A computer, comprising a processing circuit and a memory coupling to the processing circuit, wherein the memory is configured to store a program, wherein the program, when executed by the processing circuit, implements the steps of the method for blocking an external boot device according to claim 1.

* * * * *